(12) United States Patent
Upadhyaya et al.

(10) Patent No.: US 10,790,996 B2
(45) Date of Patent: Sep. 29, 2020

(54) SMART BYPASS DIODE BRIDGE RECTIFIERS

(71) Applicant: Hewlett Packard Enterprise Development LP, Houston, TX (US)

(72) Inventors: Vigneshwara Upadhyaya, Bangalore (IN); Unnikrishnan Puthanveedu, Bangalore (IN); Hemanth Maddhula, Bangalore (IN); Arunachalaprabhu Gunasekaran, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 513 days.

(21) Appl. No.: 15/437,998

(22) Filed: Feb. 21, 2017

(65) Prior Publication Data

US 2018/0241578 A1 Aug. 23, 2018

(51) Int. Cl.
*H04L 12/10* (2006.01)
*H04L 12/40* (2006.01)

(52) U.S. Cl.
CPC .............. *H04L 12/10* (2013.01); *H04L 12/40* (2013.01); *H04L 12/40045* (2013.01)

(58) Field of Classification Search
CPC .... H04L 12/10; H04L 12/40; H04L 12/40045
USPC ......... 307/1, 65; 324/713; 363/127; 323/282
See application file for complete search history.

(56) References Cited

U.S. PATENT DOCUMENTS

| | | | |
|---|---|---|---|
| 8,581,438 B2 | 11/2013 | Heath et al. | |
| 8,674,546 B1 | 3/2014 | Dix et al. | |
| 8,836,292 B1* | 9/2014 | Klughart | H02P 9/14 322/24 |
| 9,231,402 B2 | 1/2016 | Landry | |
| 9,419,807 B2 | 8/2016 | Huff et al. | |
| 9,485,103 B2 | 11/2016 | Wright et al. | |
| 2007/0171690 A1* | 7/2007 | Apfel | H02M 7/23 363/127 |
| 2009/0168278 A1 | 7/2009 | Landry | |
| 2014/0043012 A1* | 2/2014 | Fischer | G01R 19/2509 324/76.11 |
| 2014/0084681 A1 | 3/2014 | Vigna et al. | |

(Continued)

FOREIGN PATENT DOCUMENTS

| | | |
|---|---|---|
| CN | 101594236 B | 9/2012 |
| CN | 103546300 A | 1/2014 |
| CN | 103888272 A | 6/2014 |

(Continued)

OTHER PUBLICATIONS

Texas Instruments, "Zero IQ Smart Diode Rectifier Controller with 70uA Gate Drive", http://www.ti.com/product/LM74670Q1, Nov. 30, 2016, 2 pages.

(Continued)

*Primary Examiner* — Rexford N Barnie
*Assistant Examiner* — Toan T Vu
(74) *Attorney, Agent, or Firm* — Brooks, Cameron & Huebsch, PLLC

(57) ABSTRACT

Example implementations relate to smart bypass diode bridge rectifiers. For example, a device can include a power over Ethernet input. In some examples, the device can include a plurality of smart bypass diodes connected to the power over Ethernet input to form a bridge rectifier. In some examples, the device can also include a powered device connected to the bridge rectifier.

7 Claims, 3 Drawing Sheets

(56) References Cited

U.S. PATENT DOCUMENTS

2014/0164795 A1* 6/2014 Wright .................... H04L 12/10
                                                              713/300
2018/0375673 A1* 12/2018 Wendt .................... H04L 12/10

FOREIGN PATENT DOCUMENTS

DE       102015012413       10/2016
WO       2017/001179 A1      1/2017

OTHER PUBLICATIONS

Extended European Search Report received for EP Patent Application No. 17198049.3, dated Dec. 8, 2017, 7 pages.

* cited by examiner

SMART BYPASS DIODE BRIDGE RECTIFIERS

BACKGROUND

Networks can include a plurality of access points that can utilize a plurality of Ethernet ports to communicate with other network devices. The plurality of Ethernet ports can include ports that support power over Ethernet (PoE). PoE can be utilized to transfer electrical current via the Ethernet data cables rather than via power cables. PoE can minimize the quantity of wires connected to a network device.

DETAILED DESCRIPTION

Figure 1:
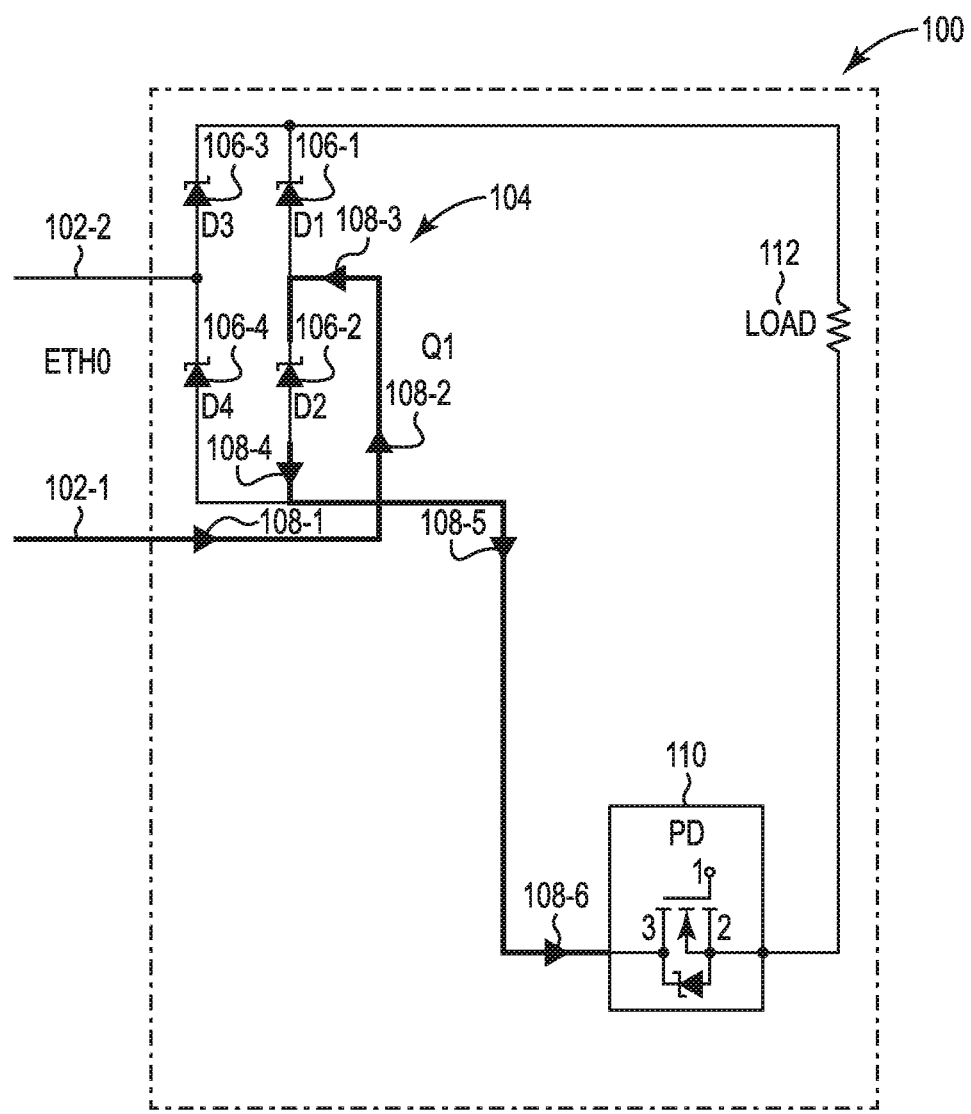
FIG. 1 illustrates an example device for smart bypass diode bridge rectifiers, consistent with the present disclosure.

Smart bypass diode bridge rectifiers can enable a device to utilize a plurality of Ethernet ports for power over Ethernet (PoE). In some examples, the device can be a network device such as an access point. As used herein, 'access point' (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Utilizing PoE can reduce a quantity of wires to be connected to the device. For example, a single Ethernet port utilizing PoE can deliver power and data to the device. In some examples, the device can include a plurality of Ethernet ports that can be utilized to send and receive data. In some previous examples, a device may utilize a single Ethernet port for PoE. In these previous examples, power provided by a first power sourcing equipment (PSE) device connected to a first PoE port can deactivate a second PSE device connected to a second PoE port. Thus, in these previous examples, multiple PoE ports may not be capable of being utilized as a backup PoE ports if one or more PoE ports fail and/or may not be capable of utilizing multiple PoE ports together to provide additional power to the device.

Utilizing smart bypass diode bridge rectifiers as described herein can allow a device with a plurality of PoE ports to utilize the plurality of PoE ports as failsafe PoE ports and/or utilize the PoE ports together to provide additional power for the device. In some examples, a smart bypass diode bridge rectifier can comprise a plurality of smart diodes to form a bridge rectifier. As used herein, a 'bridge rectifier' can, for example, refer to a number of diodes (e.g., four diodes, etc.) in a bridge arrangement to achieve full-wave rectification. In some examples, the number of diodes are smart bypass diodes to form a smart bypass diode bridge rectifier.

As used herein, a 'smart bypass diode' can, for example, refer to a diode that acts as a MOSFET diode above a threshold voltage and prevents a reverse bias. In some examples, the smart bypass diodes can provide no forward voltage drop. In previous examples, P-N junction diodes or Schottky diodes were used to mitigate a reverse bias, but these diodes have a relatively high forward voltage drop (e.g., 0.6 Volt (V) for P-N junction diodes and 0.4 V for Schottky diodes, etc.). In some examples, the smart bypass diode can include a 30 V maximum reverse voltage (VR), a 15 Amp (A) maximum forward current (IF), a relatively low forward voltage drop, and/or relatively less power dissipation and lower leakage current compared to Schottky diodes.

As described further herein, the smart bypass diode bridge rectifiers can be utilized to prevent a deadlock when a plurality of PoE ports are utilized by a device. For example, the device can include a first PoE input connected to a first smart bypass diode bridge rectifier and a second PoE input connected to a second smart bypass diode bridge rectifier. In this example, the first and second smart bypass diode bridge rectifiers can prevent a deadlock between the first PoE input and the second PoE input by preventing a reverse bias. In some examples, the smart bypass diode bridge rectifiers can reduce power dissipation (e.g., 96.28% reduction) compared to other types of H-bridge rectifiers. In addition, the smart bypass diode bridge rectifiers can be utilized to achieve hitless failover between the plurality of PoE ports of a device.

FIG. 1 illustrates an example device 100 for smart bypass diode bridge rectifiers, consistent with the present disclosure. In some examples, the device 100 can be a network device such as an access point or controller. The device 100 can include a PoE port (e.g., ETH0) that can include a first input 102-1 (e.g., negative input, etc.) and a second input 102-2 (e.g., positive input, etc.). As described herein, a PoE port can be utilized to transfer data and power to the device 100.

In some examples, the PoE port can be connected to a smart bypass diode bridge rectifier 104. The smart bypass diode bridge rectifier 104 can be a H-bridge rectifier that utilizes a number of smart bypass diodes 106-1, 106-2, 106-3, 106-4. As described herein, the smart bypass diodes 106-1, 106-2, 106-3, 106-4 can include diodes that act as MOSFET diodes above a threshold voltage and prevent a reverse bias. In some examples, the smart bypass diodes 106-1, 106-2, 106-3, 106-4 can provide no forward voltage drop. In some examples, the smart bypass diodes 106-1, 106-2, 106-3, 106-4 can include a 30 V maximum reverse voltage (VR), a 15 Amp (A) maximum forward current (IF), a relatively low forward voltage drop, and/or relatively less power dissipation and lower leakage current compared to Schottky diodes.

In some examples, the PoE port can be connected to power source equipment (PSE) devices that can provide electrical power to the device 100. As described herein, the PoE port can include a first input 102-1 that can be connected to a negative terminal of a power source and/or a negative terminal of the PSE device. In some examples, the second input 102-2 can be connected to a positive terminal of a power source and/or a negative terminal of the PSE device. In other examples, the first input 102-1 can be connected to a positive terminal and the second input 102-2 can be connected to a negative terminal.

In some examples, electrical power can be transferred through the first input 102-1 via a pathway comprising a plurality of points 108-1, 108-2, 108-3, 108-4, 108-5, 108-6 to a powered device (PD). For example, electrical power from a negative terminal of a PSE device can be received at the input 102-1 and proceed to a first point 108-1, proceed to a second point 108-2, proceed to a third point 108-3, proceed to a smart diode 106-2, proceed to a fourth point 108-4, proceed to a fifth point 108-5, proceed to a sixth point 108-6 and then proceed to a first connection of a powered device 110. In some examples, a second connection of the powered device can be connected to a first connection of a load 112. In some examples, a second connection of the load 112 can be connected to the smart bypass diode bridge rectifier 104 via smart bypass diode 106-3.

In some examples, the smart bypass diode bridge rectifier 104 can be utilized to allow for different types of PSE devices to be connected to the device. For example, PSE devices can utilize a positive terminal for connecting to the first input 102-1 and a negative terminal for connecting to the second input 102-1. In some examples, the smart bypass diode bridge rectifier 104 can be utilized to avoid deadlock between PSE devices when multiple PoE ports are utilized to provide power to the device 100.

Figure 2:
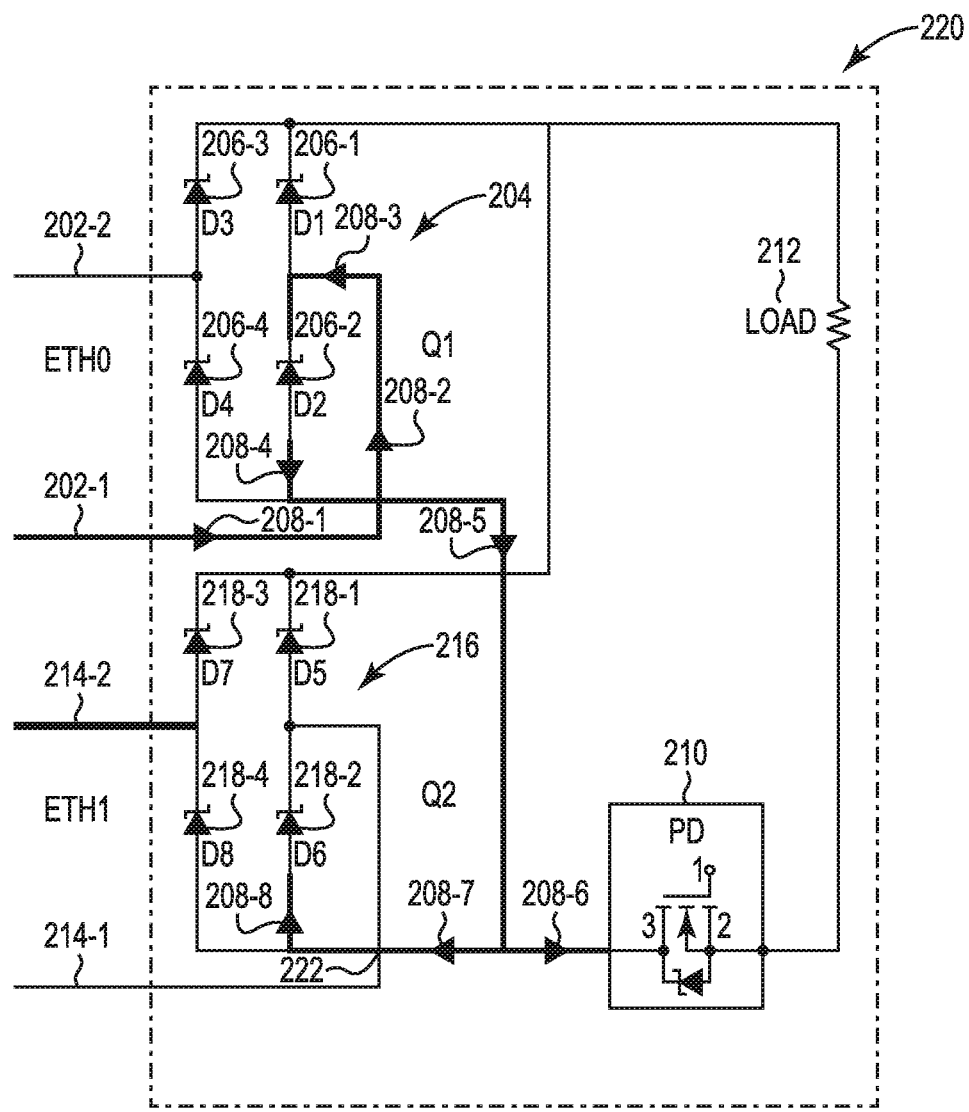
FIG. 2 further illustrates an example device for smart bypass diode bridge rectifiers, consistent with the present disclosure.

FIG. 2 further illustrates an example device 220 for smart bypass diode bridge rectifiers, consistent with the present disclosure. In some examples, the device 220 can be a network device such as an access point or controller. The device 220 can include a first PoE port (e.g., ETH0) and a second PoE port (e.g., ETH1). The first PoE port can include a first input 202-1 (e.g., negative input, etc.) and a second input 202-2 (e.g., positive input, etc.). The second PoE port can include a first input 214-1 (e.g., negative input) and a second input 214-2 (e.g., positive input). As described herein, the first PoE port and the second PoE port can each be utilized to transfer data and power to the device 220.

In some examples, the first PoE port can be connected to a first smart bypass diode bridge rectifier 204. The first smart bypass diode bridge rectifier 204 can be a H-bridge rectifier that utilizes a number of smart bypass diodes 206-1, 206-2, 206-3, 206-4. As described herein, the smart bypass diodes 206-1, 206-2, 206-3, 206-4 can include diodes that act as MOSFET diodes above a threshold voltage and prevent a reverse bias. In some examples, the smart bypass diodes 206-1, 206-2, 206-3, 206-4 can provide no forward voltage drop. In some examples, the smart bypass diodes 206-1, 206-2, 206-3, 206-4 can include a 30 V maximum reverse voltage (VR), a 15 Amp (A) maximum forward current (IF), a relatively low forward voltage drop, and/or relatively less power dissipation and lower leakage current compared to Schottky diodes.

In some examples, the first PoE port can be connected to a first power source equipment (PSE) device that can provide electrical power to the device 220. As described herein, the first PoE port can include a first input 202-1 that can be connected to a negative terminal of a power source and/or a negative terminal of the first PSE device. In some examples, the second input 202-2 can be connected to a positive terminal of a power source and/or a positive terminal of the first PSE device. In other examples, the first input 202-1 can be connected to a positive terminal and the second input 202-2 can be connected to a negative terminal.

In some examples, the second PoE port can be connected to a second smart bypass diode bridge rectifier 216. In some examples, the second smart bypass diode bridge rectifier 216 can be connected to a parallel bridge rectifier (e.g., smart bypass diode bridge rectifier 204, etc.) connected to a parallel power over Ethernet port (e.g., PoE port (ETH0), PoE input 202-1, PoE input 202-2, etc.). The second smart bypass diode bridge rectifier 216 can be a H-bridge rectifier that utilizes a number of smart bypass diodes 218-1, 218-2, 218-3, 218-4. As described herein, the smart bypass diodes 218-1, 218-2, 218-3, 218-4 can include diodes that act as MOSFET diodes above a threshold voltage and prevent a reverse bias. In some examples, the smart bypass diodes 218-1, 218-2, 218-3, 218-4 can provide no forward voltage drop. In some examples, the smart bypass diodes 218-1, 218-2, 218-3, 218-4 can include a 30 V maximum reverse voltage (VR), a 15 Amp (A) maximum forward current (IF), a relatively low forward voltage drop, and/or relatively less power dissipation and lower leakage current compared to Schottky diodes.

In some examples, the second PoE port can be connected to a second PSE device that can provide electrical power to the device 220. As described herein, the second PoE port can include a first input 214-1 that can be connected to a negative terminal of a power source and/or a negative terminal of the second PSE device. In some examples, the second input 214-2 can be connected to a positive terminal of a power source and/or a positive terminal of the second PSE device. In other examples, the first input 214-1 can be connected to a positive terminal and the second input 214-2 can be connected to a negative terminal.

In some examples, electrical power can be transferred through the first input 202-1 of the first PoE port via a pathway comprising a plurality of points 208-1, 208-2, 208-3, 208-4, 208-5, 208-6 to a powered device (PD). For example, electrical power from a negative terminal of a first PSE device can be received at the input 202-1 and proceed to a first point 208-1, proceed to a second point 208-2, proceed to a third point 208-3, proceed to a smart diode 206-2, proceed to a fourth point 208-4, proceed to a fifth point 208-5, proceed to a sixth point 208-6 and then proceed to a first connection of a powered device 210. In some examples, a second connection of the powered device 210 can be connected to a first connection of a load 212. In some examples, a second connection of the load 212 can be connected to the smart bypass diode bridge rectifier 204 via smart bypass diode 206-3.

In some examples, the electrical power transferred through the first input 202-1 can proceed to the second smart bypass diode bridge rectifier 216 via point 208-7, proceed to point 208-8, and then proceed to smart bypass diode 218-2 of the second smart bypass diode bridge rectifier 216. As described herein, the smart bypass diode 218-2 can prevent a reverse bias and thus prevent the electrical power from being transferred through the second smart bypass diode bridge rectifier 216 to the first input 214-1 of the second PoE port. In some examples, the second smart bypass diode bridge rectifier 216 can prevent electrical power from being provided to a second PSE device. In these examples, the second smart bypass diode bridge rectifier 216 can prevent the electrical power such that the second PSE device is not deactivated or remains activated. For example, electrical power provided to the first input 214-1 through the second smart bypass diode bridge rectifier 216 can deactivate a second PSE device connected to the second PoE port. In some examples, this deactivation can be known as deadlock between the first PSE device and the second PSE device.

In some examples, the first input 202-1 of the first PoE port can be connected between a first smart bypass diode 206-1 and a second smart bypass diode 206-2 of the at least four smart bypass diodes of the first smart bypass diode bridge rectifier 204. In some examples, the second input 202-2 of the first PoE port is connected between a third smart bypass diode 206-3 and a fourth smart bypass diode 206-4 of the at least four smart bypass diodes of the first bridge rectifier 304. In some examples, the first input 214-1 of the second PoE port can be connected between a first smart bypass diode 218-1 and a second smart bypass diode 218-2 of the at least four smart bypass diodes of the second smart bypass diode bridge rectifier 316. In some examples, the second input 214-2 of the second PoE port is connected between a third smart bypass diode 218-3 and a fourth smart bypass diode 218-4 of the at least four smart bypass diodes of the second bridge rectifier 316.

As described further herein, the smart bypass diode bridge rectifiers 204, 216 can be utilized to prevent a deadlock when a plurality of PoE ports are utilized by a device 220. For example, the device 220 can include a first PoE input connected to a first smart bypass diode bridge rectifier 204 and a second PoE input connected to a second smart bypass diode bridge rectifier 216. In this example, the first smart bypass diode bridge rectifier 204 and second smart bypass diode bridge rectifier 216 can prevent a deadlock between the first PSE device and the second PSE device by preventing a reverse bias. In some examples, the smart bypass diode bridge rectifiers 204, 216 can reduce power dissipation (e.g., 96.28% reduction) compared to other types of H-bridge rectifiers. In addition, the smart bypass diode bridge rectifiers 204, 216 can be utilized to achieve hitless failover between the plurality of PoE ports of a device 220.

Figure 3:
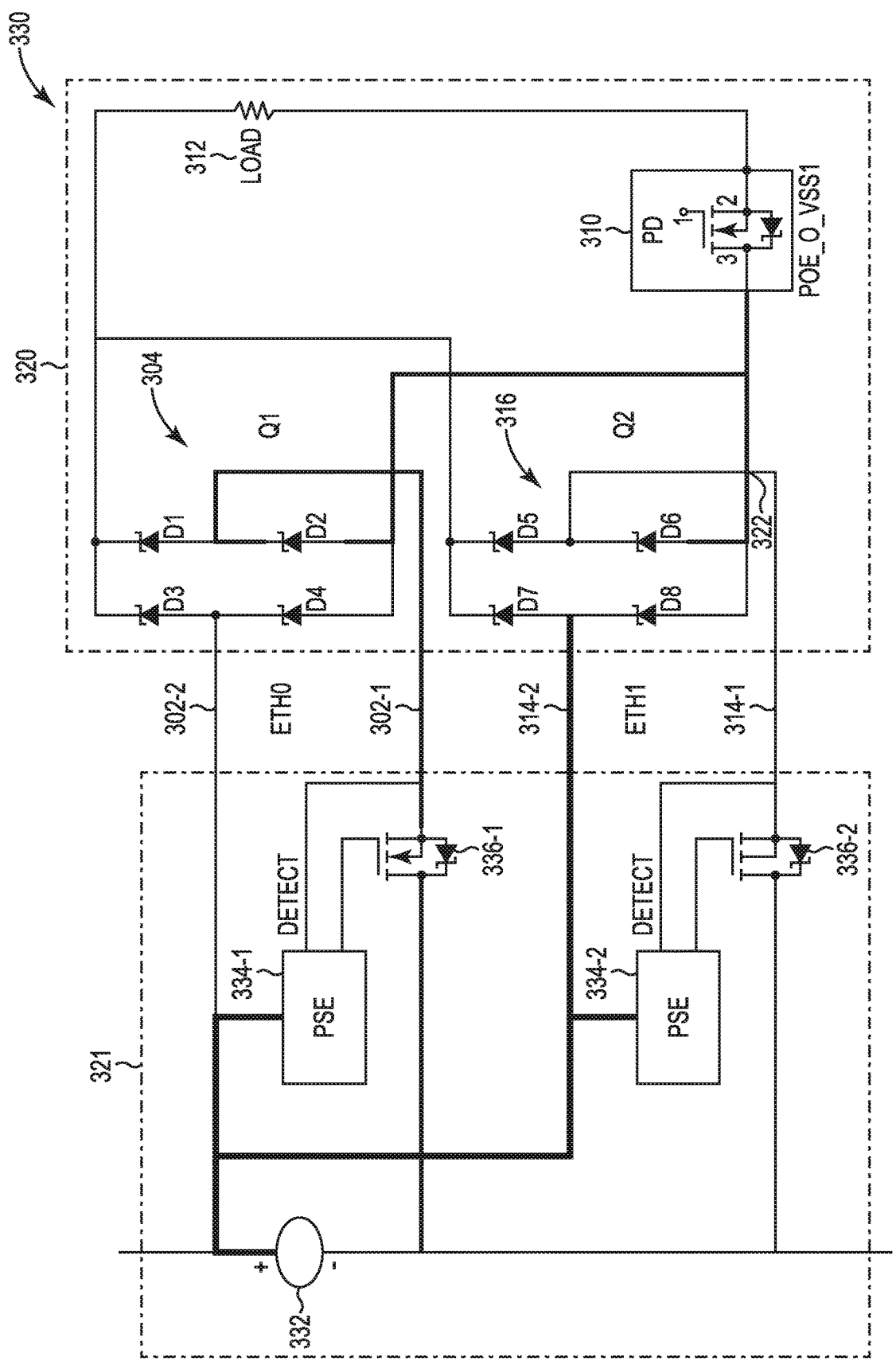
FIG. 3 illustrates an example system for smart bypass diode bridge rectifiers, consistent with the present disclosure.

FIG. 3 illustrates an example system 330 for smart bypass diode bridge rectifiers, consistent with the present disclosure. In some examples, a device 320 can be a network device such as an access point or controller. The device 320 can include a first PoE port (e.g., ETH0) and a second PoE port (e.g., ETH1). The first PoE port can include a first input 302-1 (e.g., negative input, etc.) and a second input 302-2 (e.g., positive input, etc.). The second PoE port can include a first input 314-1 (e.g., negative input) and a second input 314-2 (e.g., positive input). As described herein, the first PoE port and the second PoE port can each be utilized to transfer data and power to the device 320. As described herein, the first PoE port can be a parallel PoE port to the second PoE port.

In some examples, the device 320 can be connected to a device 321. In some examples, the device 321 can be a network switch such as a PoE switch that can utilize PoE to power device 320. In some examples, the device 321 can be connected to device 320 via the first PoE port and the second PoE port. In some examples, the device 321 can include a power source 332. The power source can be a power input that is connected to an electrical power grid. The power source 332 can be connected to a plurality of power sourcing equipment (PSE) devices 334-1, 334-2. The PSE devices 334-1, 334-2 can be utilized to convert the electrical power from the power source 332 to be transferred to the device 320 via PoE. In some examples, the PSE devices 334-1, 334-2 can alter a voltage or current of the electrical power provided by the power source 332 based on a specification of the PSE devices 334-1, 334-2 and/or a specification of the powered device 310 of the device 320.

In some examples, a first PSE device 334-1 of the device 321 can be connected to a first PoE port of the device 320 that can be connected to a first smart bypass diode bridge rectifier 104. The first smart bypass diode bridge rectifier 304 can be a H-bridge rectifier that utilizes a number of smart bypass diodes. As described herein, the smart bypass diodes can include diodes that act as MOSFET diodes above a threshold voltage and prevent a reverse bias. In some examples, the smart bypass diodes can provide no forward voltage drop. In some examples, the smart bypass diodes can include a 30 V maximum reverse voltage (VR), a 15 Amp (A) maximum forward current (IF), a relatively low forward voltage drop, and/or relatively less power dissipation and lower leakage current compared to Schottky diodes.

As described herein, the first PoE port can be connected to the first power source equipment (PSE) device 334-1 that can provide electrical power to the device 220. The first PoE port can include a first input 302-1 that can be connected to a negative terminal of the power source 332 and/or a negative terminal of the first PSE device 334-1. In some examples, the first input 302-1 can be connected to a switch 336-1. The switch 336-1 can be connected to a negative terminal of the power source 332 and a negative terminal of the first PSE device 334-1. In some examples, the switch 336-1 can be activated and/or deactivated via the electrical power provided by the power source 332. In some examples, the second input 302-2 can be connected to a positive terminal of the power source 332 and/or a positive terminal of the first PSE device 334-1. In other examples, the first input 302-1 can be connected to a positive terminal and the second input 302-2 can be connected to a negative terminal.

In some examples, the second PoE port can be connected to a second PSE device 334-2 that can provide electrical power to a second smart bypass diode bridge rectifier 316. The second smart bypass diode bridge rectifier 316 can be a H-bridge rectifier that utilizes a number of smart bypass diodes. As described herein, the smart bypass diodes can include diodes that act as MOSFET diodes above a threshold voltage and prevent a reverse bias. In some examples, the smart bypass diodes can provide no forward voltage drop. In some examples, the smart bypass diodes can include a 30 V maximum reverse voltage (VR), a 15 Amp (A) maximum forward current (IF), a relatively low forward voltage drop, and/or relatively less power dissipation and lower leakage current compared to Schottky diodes.

In some examples, the second PoE port can be connected to the second PSE device 334-2 that can provide electrical power to the device 320. As described herein, the second PoE port can include a first input 314-1 that can be connected to a negative terminal of the power source 332 and/or a negative terminal of the second PSE device 334-2. In some examples, the second input 314-2 can be connected to a positive terminal of the power source 332 and/or a positive terminal of the second PSE device 334-2. In other examples, the first input 314-1 can be connected to a positive terminal and the second input 314-2 can be connected to a negative terminal.

In some examples, electrical power can be transferred through the first input 302-1 of the first PoE port via a pathway comprising a plurality of points to a powered device (PD) 310. For example, electrical power from a negative terminal of the first PSE device 334-1 can be received at the input 302-1 and proceed to a smart diode 306-2 and then proceed to a first connection of a powered device 310. In some examples, a second connection of the powered device 310 can be connected to a first connection of a load 312. In some examples, a second connection of the load 312 can be connected to the first smart bypass diode bridge rectifier 304 via smart bypass diode 306-3.

In some examples, the electrical power transferred through the first input 302-1 can proceed to the second smart bypass diode bridge rectifier 316 via intersection 322 and then proceed to a smart bypass diode (e.g., smart bypass diode D6, etc.) of the second smart bypass diode bridge rectifier 316. As described herein, the smart bypass diode can prevent a reverse bias and thus prevent the electrical power from being transferred through the second smart bypass diode bridge rectifier 316 to the first input 314-1 of the second PoE port.

In some examples, the second smart bypass diode bridge rectifier 316 can prevent electrical power from being provided to a second PSE device 334-2 of the device 321 via the first input 314 of the second PoE port. In these examples, the second smart bypass diode bridge rectifier 316 can prevent the electrical power such that the second PSE device 334-2 is not deactivated or remains activated. For example, electrical power provided to the first input 314-1 through the second smart bypass diode bridge rectifier 316 can proceed to switch 336-2 and deactivate a second PSE device 334-2 connected to the second PoE port. In some examples, this deactivation can be known as deadlock between the first PSE device 334-1 and the second PSE device 334-2.

In some examples, the first input 302-1 can be connected between a first smart bypass diode D1 and a second smart bypass diode D2 of the at least four smart bypass diodes of the first smart bypass diode bridge rectifier 304. In some examples, the second input 302-2 is connected between a third smart bypass diode D3 and a fourth smart bypass diode D4 of the at least four smart bypass diodes of the first bridge rectifier 304.

In some examples, the first smart bypass diode bridge rectifier 304 and the second smart bypass diode bridge rectifier 316 accept a coupling from type A power source equipment devices and type B power source equipment devices. For example, the first PoE port can be connected to either a type A power source equipment device or a type B power source equipment device. As used herein, a 'type A power source equipment device' can, for example, refer to a PSE device that transmits power on the same wires as data for 10 Megabits per second (Mbit/s) and 100 Mbit/s. In some examples, the type A power source equipment can be similar to phantom power techniques. As used herein, a 'type B power source equipment device' can, for example, refer to a PSE device that utilizes separate data and power conductors for transmitting data on a first wire and transmitting power on a second wire.

As described further herein, the smart bypass diode bridge rectifiers 304, 316 can be utilized to prevent a deadlock between the first PSE device 334-1 and the second PSE device 334-2 when a plurality of PoE ports are utilized to connect a device 321 to a device 320. For example, the device 320 can include a first PoE port connected to a first smart bypass diode bridge rectifier 304 and a second PoE port connected to a second smart bypass diode bridge rectifier 316. In this example, the first smart bypass diode bridge rectifier 304 and second smart bypass diode bridge rectifier 316 can prevent a deadlock between the first PSE device 334-1 and the second PSE device 334-2 by preventing a reverse bias. In some examples, the smart bypass diode bridge rectifiers 304, 316 can reduce power dissipation (e.g., 96.28% reduction) compared to other types of H-bridge rectifiers. In addition, the smart bypass diode bridge rectifiers 304, 316 can be utilized to achieve hitless failover between the plurality of PoE ports of a device 320.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A network device, comprising:
   a first power over Ethernet input connected to a first plurality of smart bypass diodes that form a first bridge rectifier, wherein the first power over Ethernet input is arranged to be connected to a first power source equipment device;
   a second power over Ethernet input connected to a second plurality of smart bypass diodes that form a second bridge rectifier that is connected to the first bridge rectifier, wherein the second power over Ethernet input is arranged to be connected to a second power source equipment device; and
   a powered device connected to the first bridge rectifier and the second bridge rectifier, wherein the second plurality of smart bypass diodes in the second bridge rectifier is arranged to prevent a reverse bias from providing power to the second power source equipment device.

2. The network device of claim 1, wherein providing power to the second power source equipment device from the second bridge rectifier deactivates the second power source equipment device.

3. The network device of claim 1, wherein the first bridge rectifier and the second bridge rectifier accept a coupling from type A power source equipment devices and type B power source equipment devices.

4. An access point, comprising:
   a first power over Ethernet input connected to at least four smart bypass diodes that form a first bridge rectifier, wherein the first power over Ethernet input is connected to a first power source equipment device that provides power to the first bridge rectifier;
   a second power over Ethernet input connected to at least four smart bypass diodes that form a second bridge rectifier that is connected to the first bridge rectifier, wherein the second power over Ethernet input is connected to a second power source equipment device that provides power to the second bridge rectifier;
   a powered device connected to the first bridge rectifier and the second bridge rectifier, wherein the second plurality of smart bypass diodes in the second bridge rectifier is arranged to prevent a reverse bias from providing power to the second power source equipment device; and
   a load connected to the powered device and the first bridge rectifier.

5. The access point of claim 4, wherein the first power over Ethernet input is connected between a first smart bypass diode and a second smart bypass diode of the at least four smart bypass diodes of the first bridge rectifier.

6. The access point of claim 5, wherein the second power over Ethernet input is connected between a third smart bypass diode and a fourth smart bypass diode of the at least four smart bypass diodes of the second bridge rectifier.

7. The access point of claim 4, wherein a fifth smart bypass diode of the at least four smart bypass diodes of the second bridge rectifier prevents a reverse bias from being provided to the second power source equipment device.

\* \* \* \* \*